United States Patent
Colson et al.

(10) Patent No.: US 11,655,039 B2
(45) Date of Patent: May 23, 2023

(54) TURBINE HOUSING FOR A TWO WHEEL AIR CYCLE MACHINE

(71) Applicant: Hamilton Sundstrand Corporation, Charlotte, NC (US)

(72) Inventors: Darryl A. Colson, West Suffield, CT (US); Eric Chrabascz, Longmeadow, MA (US); Clarence J. Wytas, Stafford Springs, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 121 days.

(21) Appl. No.: 17/218,545

(22) Filed: Mar. 31, 2021

(65) Prior Publication Data

US 2021/0309372 A1    Oct. 7, 2021

Related U.S. Application Data

(60) Provisional application No. 63/004,820, filed on Apr. 3, 2020.

(51) Int. Cl.
*B64D 13/06*    (2006.01)
*F04D 29/057*    (2006.01)
(Continued)

(52) U.S. Cl.
CPC ........... *B64D 13/06* (2013.01); *F04D 29/057* (2013.01); *F04D 29/124* (2013.01);
(Continued)

(58) Field of Classification Search
CPC ...... F01D 25/24; F04D 29/4206; B64D 13/06
See application file for complete search history.

(56) References Cited

U.S. PATENT DOCUMENTS

| 5,214,935 A | 6/1993 | Brunskill |
| 5,791,868 A | 8/1998 | Bosley et al. |

(Continued)

FOREIGN PATENT DOCUMENTS

| EP | 3539876 A1 | 9/2019 |
| EP | 3705730 A1 | 9/2020 |
| WO | 9914510 A1 | 3/1999 |

OTHER PUBLICATIONS

Extended European Search Report for European Patent Application No. 21166191.3, dated May 21, 2021, 9 pages.
(Continued)

*Primary Examiner* — Michael L Sehn
(74) *Attorney, Agent, or Firm* — Kinney & Lange, P.A.

(57) ABSTRACT

A turbine housing for a two-wheel air cycle machine includes a first side of the turbine housing, a second side of the turbine housing, a central axis, an outer housing portion, an inner housing portion, a plurality of struts between the inner housing portion and the outer housing portion and a plurality of cooling slots between the plurality of supports. The outer housing portion includes an inner surface, an outer surface, a cooling inlet extending from the outer surface of the outer housing portion and a cooling outlet opposite the cooling inlet and extending from the outer surface of the outer housing portion. The inner housing portion includes a thrust bearing support surface substantially parallel to the second side of the turbine housing and a journal bearing bore extending between the first side of the turbine housing and the thrust bearing support surface.

19 Claims, 6 Drawing Sheets

(51) Int. Cl.
*F04D 29/12* (2006.01)
*F04D 29/58* (2006.01)
*F04D 29/42* (2006.01)
*F01D 25/24* (2006.01)

(52) U.S. Cl.
CPC ....... *F04D 29/4206* (2013.01); *F04D 29/584* (2013.01); *B64D 2013/0618* (2013.01); *B64D 2013/0648* (2013.01); *F01D 25/24* (2013.01)

(56) References Cited

U.S. PATENT DOCUMENTS

| | | | |
|---|---|---|---|
| 8,747,066 B2* | 6/2014 | Strom | F01D 11/005 |
| | | | 415/214.1 |
| 9,393,652 B2 | 7/2016 | Colson et al. | |
| 9,470,234 B2* | 10/2016 | Rosen | F16C 33/74 |
| 9,556,885 B2* | 1/2017 | Beers | F04D 25/06 |
| 9,745,858 B2 | 8/2017 | Beers et al. | |
| 9,784,126 B2 | 10/2017 | Army et al. | |
| 9,803,493 B2* | 10/2017 | Svihla | F01D 11/02 |
| 9,897,093 B2 | 2/2018 | Army, Jr. et al. | |
| 10,160,546 B2 | 12/2018 | Beers et al. | |
| 10,215,224 B1 | 2/2019 | Lee et al. | |
| 10,400,628 B2 | 9/2019 | Beers et al. | |
| 2006/0083609 A1* | 4/2006 | Augspurger | F02B 39/005 |
| | | | 415/206 |
| 2009/0274548 A1 | 11/2009 | Joco et al. | |
| 2012/0156065 A1 | 6/2012 | Colson et al. | |
| 2013/0078090 A1 | 3/2013 | Beers et al. | |
| 2014/0056718 A1 | 2/2014 | Beers et al. | |
| 2015/0233386 A1 | 8/2015 | Beers et al. | |
| 2015/0345334 A1* | 12/2015 | Scott | F01D 25/30 |
| | | | 415/213.1 |
| 2018/0340571 A1 | 11/2018 | Ayyagari | |
| 2019/0285087 A1 | 9/2019 | Colson et al. | |
| 2019/0285119 A1 | 9/2019 | Colson et al. | |

OTHER PUBLICATIONS

Extended European Search Report for European Patent Application No. 21166344.8, dated Sep. 1, 2021, 11 pages.

* cited by examiner

TURBINE HOUSING FOR A TWO WHEEL AIR CYCLE MACHINE

CROSS-REFERENCE TO RELATED APPLICATION(S)

This application claims priority to U.S. Provisional Application No. 63/004,820, filed on Apr. 3, 2020, and entitled "Turbine Housing for a Two Wheel Air Cycle Machine," the disclosure of which is which is incorporated by reference in its entirety.

BACKGROUND

The present disclosure relates to air cycle machines. Specifically, the present disclosure relates to a turbine housing for an aircraft air cycle machine.

Aircraft environmental control systems use air cycle machines (ACM) to condition air to an appropriate pressure, temperature, and humidity for pilots to use in aircraft operational systems and for electronics cooling. An ACM may include a compressor rotor and a turbine rotor mechanically coupled by a tie rod. Air enters the system from a bleed source, such as the aircraft engines, and is compressed by the compressor rotor. The compressed air is then ducted to other portions of the system such as a heat exchanger and a reheater. The compressed air is then expanded through the turbine rotor and exits for use in aircraft systems. As air expands through and turns the turbine rotor, the tie rod transfers the motion to turn the compressor rotor. The tie rod is typically supported by journal bearings and thrust bearings. ACMs need components that securely support the bearings during operational conditions with increased pressure and temperatures.

SUMMARY

A turbine housing for a two-wheel air cycle machine includes a first side of the turbine housing, a second side of the turbine housing, a central axis, an outer housing portion, an inner housing portion, a plurality of struts between the inner housing portion and the outer housing portion and a plurality of cooling slots between the plurality of supports. The outer housing portion includes an inner surface, an outer surface, a cooling inlet extending from the outer surface of the outer housing portion and a cooling outlet opposite the cooling inlet and extending from the outer surface of the outer housing portion. The inner housing portion includes a thrust bearing support surface substantially parallel to the second side of the turbine housing and a journal bearing bore extending between the first side of the turbine housing and the thrust bearing support surface.

A two-wheel air cycle machine for an aircraft includes a turbine assembly with a turbine rotor, a compressor assembly with a compressor rotor, a tie rod connecting the compressor rotor and the turbine rotor and supported by a turbine-end journal bearing and a compressor-end journal bearing, and thrust bearings centrally positioned between the turbine assembly and the compressor assembly. The turbine assembly further includes a turbine housing and the turbine-end journal bearing within the turbine housing. The turbine housing includes a first side, a second side, a central axis, an outer housing portion, an inner housing portion, a plurality of struts between the inner housing portion and the outer housing portion and a plurality of cooling slots between the plurality of supports. The outer housing portion includes an inner surface, an outer surface, a cooling inlet extending from the outer surface of the outer housing portion and a cooling outlet opposite the cooling inlet and extending from the outer surface of the outer housing portion. The inner housing portion includes a thrust bearing support surface substantially parallel to the second side of the turbine housing and a journal bearing bore extending between the first side of the turbine housing and the thrust bearing support surface. The compressor assembly further includes a compressor inlet housing, a compressor outlet housing connected to the compressor inlet housing, a compressor seal housing within the compressor outlet housing, a bearing housing within the compressor inlet housing and attached at a first end to the compressor seal housing and attached at a second end to the turbine housing. The bearing housing holds the compressor-end journal bearing.

DETAILED DESCRIPTION

Figure 1:
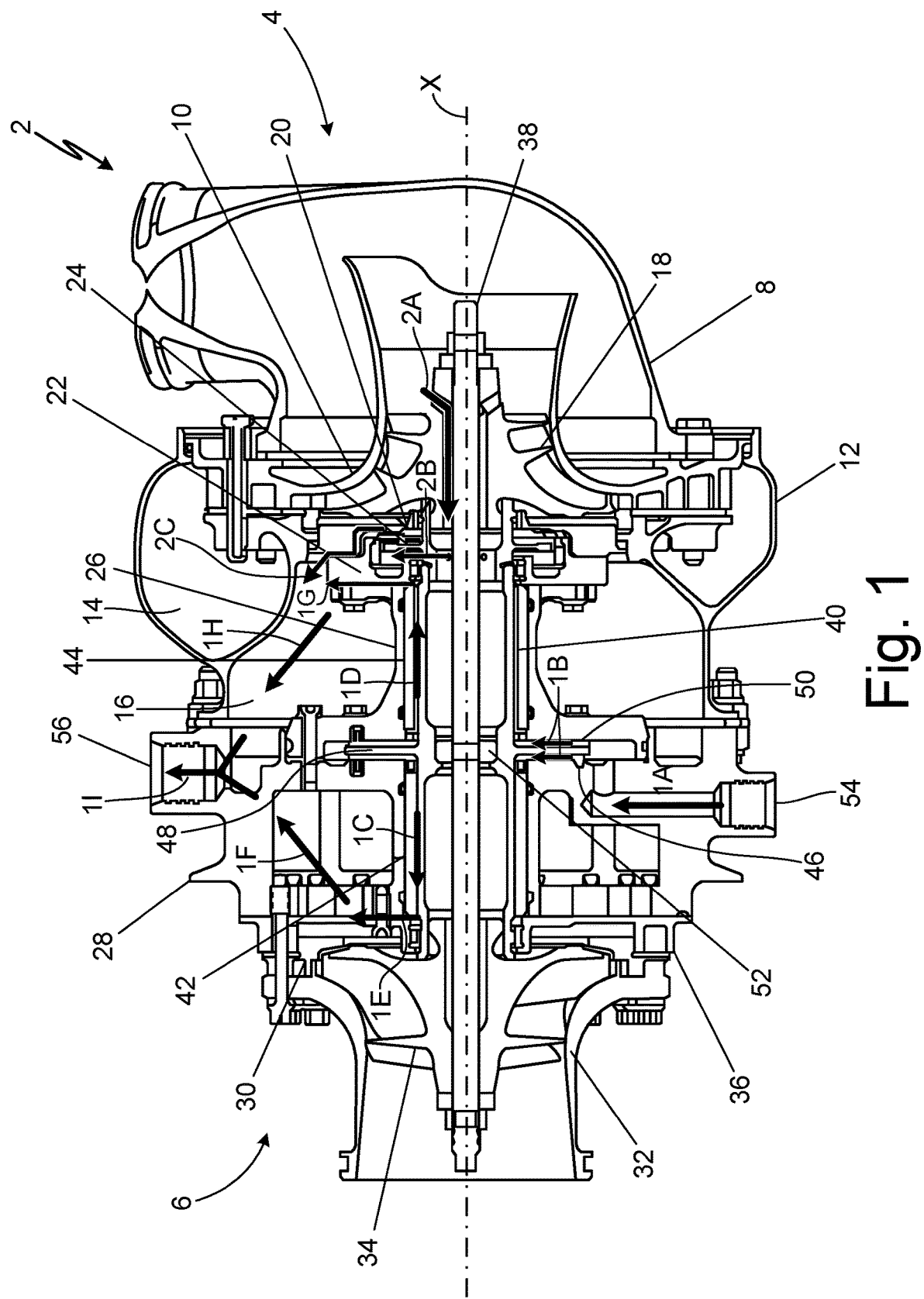
FIG. 1 is a cut-away view of a two-wheel air cycle machine showing a bearing cooling flow path and a compressor rotor thrust balancing flow path.

FIG. 1 is a cut-away view of two-wheel air cycle machine 2 showing a bearing cooling flow path and a compressor rotor balancing flow path. Two-wheel air cycle machine 2 includes compressor assembly 4 and turbine assembly 6. Compressor assembly 4 includes compressor inlet housing 8, compressor shroud 10, and compressor outlet housing 12 with outlet conduit 14 and cavity 16. Compressor assembly 4 also includes compressor rotor 18, compressor seal plate 20, seal housing 22, and seal shaft 24. Compressor assembly 4 also includes bearing housing 26. Turbine assembly 6 includes turbine housing 28, turbine nozzle 30, turbine shroud 32, and turbine rotor 34, and seal plate 36. Two-wheel air cycle machine 2 further includes tie rod 38, air bearing shaft 40, turbine-side journal bearing 42, compressor-side journal bearing 44, turbine-side thrust bearing 46, thrust disk 48, compressor-side thrust bearing 50, and tie rod support 52. Turbine housing 28 includes bearing cooling inlet 54 and bearing cooling outlet 56. FIG. 1 also shows central axis x, arrow 1A to arrow 1I, and arrow 2A to arrow 2C.

Two-wheel air cycle machine 2 has compressor assembly 4 attached to turbine assembly 6. Compressor assembly 4 has compressor inlet housing 8 attached to and surrounding compressor shroud 10. Compressor inlet housing 8 and compressor shroud 10 are also attached to compressor outlet housing 12. Within compressor outlet housing 12 are compressor outlet 14 and cavity 16. Outlet conduit 14 is fluidly connected with compressor shroud 10. Compressor rotor 18 is within compressor shroud 10. Compressor seal plate 20 is attached between compressor outlet housing 12 and compressor shroud 10. Seal housing 22 is within compressor outlet housing 12 and attached to compressor seal plate 20.

Seal housing 22 is fluidly connected to compressor inlet housing 8 through a central channel in compressor rotor 18. Seal shaft 24 is inside seal housing 22. Bearing housing 26 is within compressor outlet housing 12, surrounded by cavity 16, and attached at a first side to seal housing 22 and at a second side to turbine housing 28 of turbine assembly 6. Compressor outlet housing 12 is also attached to turbine housing 28. Turbine assembly 6 further includes turbine nozzle 30 within turbine shroud 32. Turbine shroud 32 is bolted to turbine housing 28 opposite bearing housing 26. Turbine rotor 34 is within turbine shroud 32. Turbine seal plate 36 is bolted between turbine housing 28 and turbine shroud 32.

Tie rod 38 runs through two-wheel air cycle machine 2 and is coaxial with central axis x. Tie rod 38 mechanically connects compressor rotor 18 to turbine rotor 34. Surrounding tie rod 38 is air bearing shaft 40 that is attached to and centrally located within compressor seal plate 20, seal housing 22, bearing housing 26, turbine housing 28, and turbine seal plate 36. Surrounding tie rod 38 between air bearing shaft 40 and turbine housing 28 is turbine-side journal bearing 42. Similarly, surrounding tie rod 38 between bearing housing 26 and air bearing shaft 40 is compressor-side journal bearing 44. Between turbine housing 28 and bearing housing 26 is turbine-side thrust bearing 46, thrust disk 48, and compressor-side thrust bearing 50 with thrust disk 48 located between turbine-side thrust bearing 46 and compressor-side thrust bearing 50. Turbine-side thrust bearing 46, thrust disk 48, and compressor-side thrust bearing 50 are perpendicular to axis x. Located near the center of and around tie rod 38 and within air bearing shaft 40 is tie rod support 52. Bearing cooling inlet 54 and bearing cooling outlet 56 are inlet and outlet ports, respectively, located on a radially outer surface of turbine housing 28. Bearing cooling inlet 54 is opposite bearing cooling outlet 56.

Two-wheel air cycle machine 2 is part of an air conditioning system of an aircraft. Air enters compressor assembly 4 of two-wheel air cycle machine 2 through compressor inlet housing 8. This air is from a bleed source elsewhere in the aircraft, such as the engines. Inlet housing 8 leads to compressor rotor 18 where air is compressed adding pressure, heat, and work. Air is then directed by compressor shroud 10 into outlet conduit 14 in compressor outlet housing 12. Air then flows away from two-wheel air cycle machine 2 through a duct (not shown) attached to outlet housing 12. Air then returns to two-wheel air cycle machine 2 after being cooled and dehumidified and enters through turbine nozzle 30. Air is forced through turbine rotor 34 to a lower pressure usable elsewhere in the aircraft for pilot systems and electronics cooling. Air exits two-wheel air cycle machine 2 through turbine shroud 32. When air passes through turbine rotor 34, the lost work from the decrease in pressure turns tie rod 38, transferring the lost work to compressor rotor 18. Tie rod 38 is supported by and rotates within air bearing shaft 40, turbine-side journal bearing 42, and compressor-side journal bearing 44. Turbine-side thrust bearing 46 and compressor-side thrust bearing 50 support axial loading on tie rod 38 from compressor rotor 18 and turbine rotor 34. Turbine-side journal bearing 42, compressor-side journal bearing 44, turbine-side thrust bearing 46, and compressor-side thrust bearing 50 are hydrodynamic thin foil bearings. Thrust disk 48, turbine housing 28, and bearing housing 26 hold turbine-side thrust bearing 46 and compressor-side thrust bearing 50 in place. Tie rod 38 is also supported near the center by tie-rod support 52. Turbine housing 28 and bearing housing 26 support turbine-side journal bearing 42 and compressor-side journal bearing 44, respectively.

Two-wheel air cycle machine 2 includes a bearing cooling flow path. Cooling air enters turbine housing 28 through bearing cooling inlet 54, shown by arrow 1A. The cooling flow then moves through turbine-side thrust bearing 46 and compressor-side thrust bearing 50, shown by arrows 1B. The cooling flow then splits, with a first portion, shown by arrow 1C going through turbine-side journal bearing 42 and a second portion, shown by arrow 1D, going through compressor-side journal bearing 44. The first portion then travels between turbine seal plate 36 and turbine housing 28, shown by arrow 1E, and into an inner portion of turbine housing 28, shown by arrow 1F. The second portion passes between seal housing 22 and bearing housing 26, shown by arrow 1G, and into cavity 16 and around an outer surface of bearing housing 26, shown by arrow 1H. The first portion and the second portion then converge and exit turbine housing 28 through bearing cooling outlet 56, shown by arrow 1I.

Two-wheel air cycle machine also includes a compressor rotor thrust balancing flow. The compressor rotor thrust balancing flow enters compressor inlet housing 8 and moves through a center passage in compressor rotor 18, shown by arrow 2A. The compressor rotor balancing flow then fills a space in seal housing 22 behind seal shaft 24, shown by arrow 2B. Air can leak from the seal housing 22 into cavity 16, shown by arrow 2C, and mix with the bearing cooling flow, shown by arrow 1H. The compressor rotor thrust balancing flow then exits through bearing cooling outlet 56 with the bearing cooling flow, shown by arrow 1I.

Configuring two-wheel air cycle machine 2 with a tie rod between compressor rotor 18 and turbine rotor 34 allows for work lost from the pressurized air moving through turbine assembly 6 to transfer to the air moving through compressor assembly 4. Turbine housing 28 supports tie rod 34 and holds turbine-side journal bearing 44 and turbine-side thrust bearing 46 in place. Bearing housing 26 supports tie rod 34 and holds compressor-side journal bearing 44 and compressor-side thrust bearing 50 in place. The location of turbine-side thrust bearing 46 and compressor-side thrust bearing 50 in the center of two-wheel air cycle machine 2 allows room to include thrust disk 48. Turbine housing 28 creates the bearing cooling flow path with bearing cooling inlet 54 and bearing cooling outlet 56. An exterior surface of bearing housing 26 defines the bearing cooling flow path within compressor outlet housing 12. Bearing cooling outlet 56 also acts as an outlet for the compressor rotor thrust balancing flow. Two-wheel air cycle machine 2 requires a low start up pressure due to seal housing 22, seal plate 20, and the compressor rotor thrust balancing flow path. The compressor rotor thrust balancing flow path balances the compressor rotor 18 on startup and during operation of air cycle machine 2 by pressurizing seal shaft 24 in seal housing 22 behind compressor rotor 18.

Figure 2A:
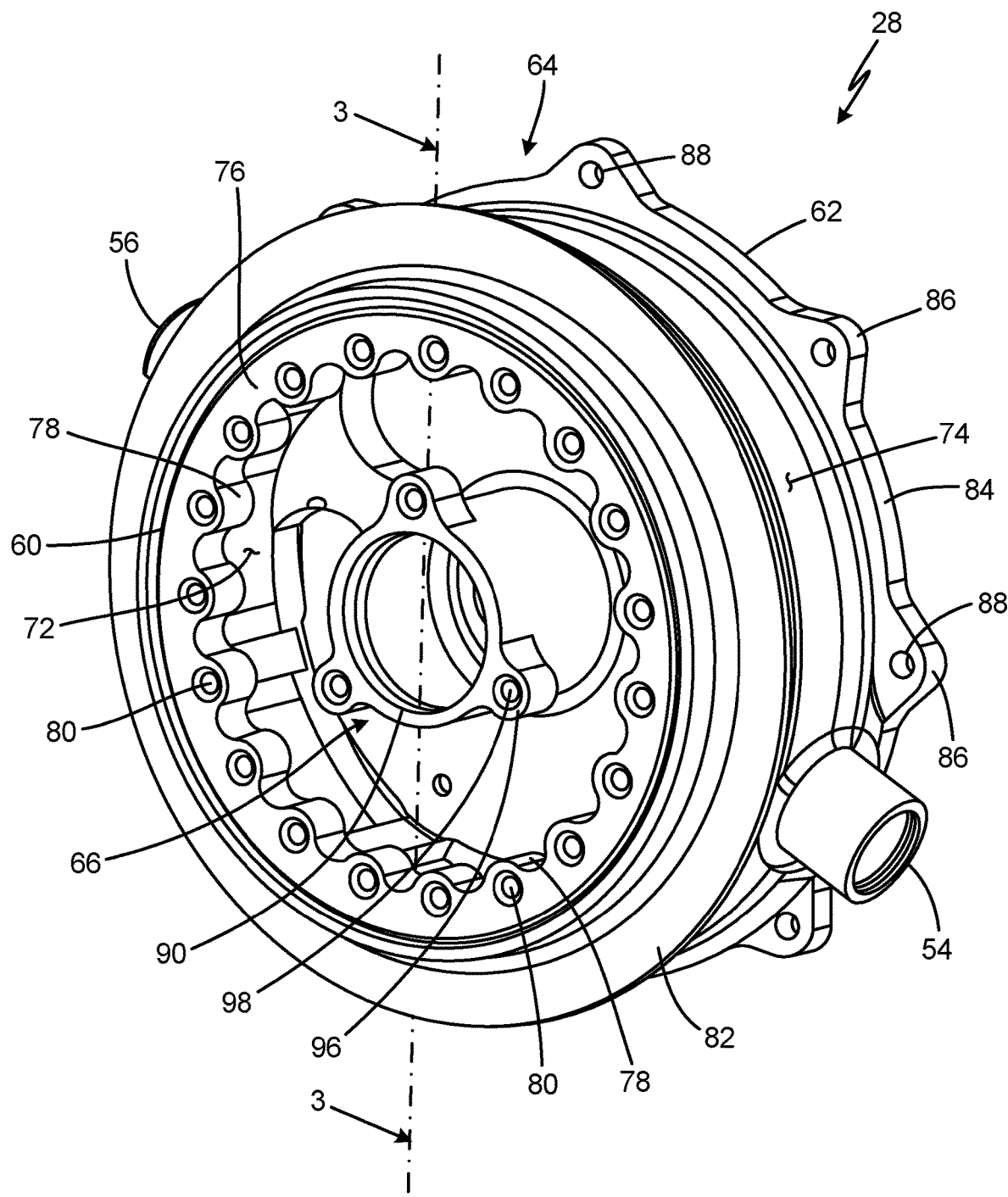
FIG. 2a is an isometric view of a turbine-facing side of a turbine housing for the two-wheel air cycle machine including line 3-3.
Figure 2B:
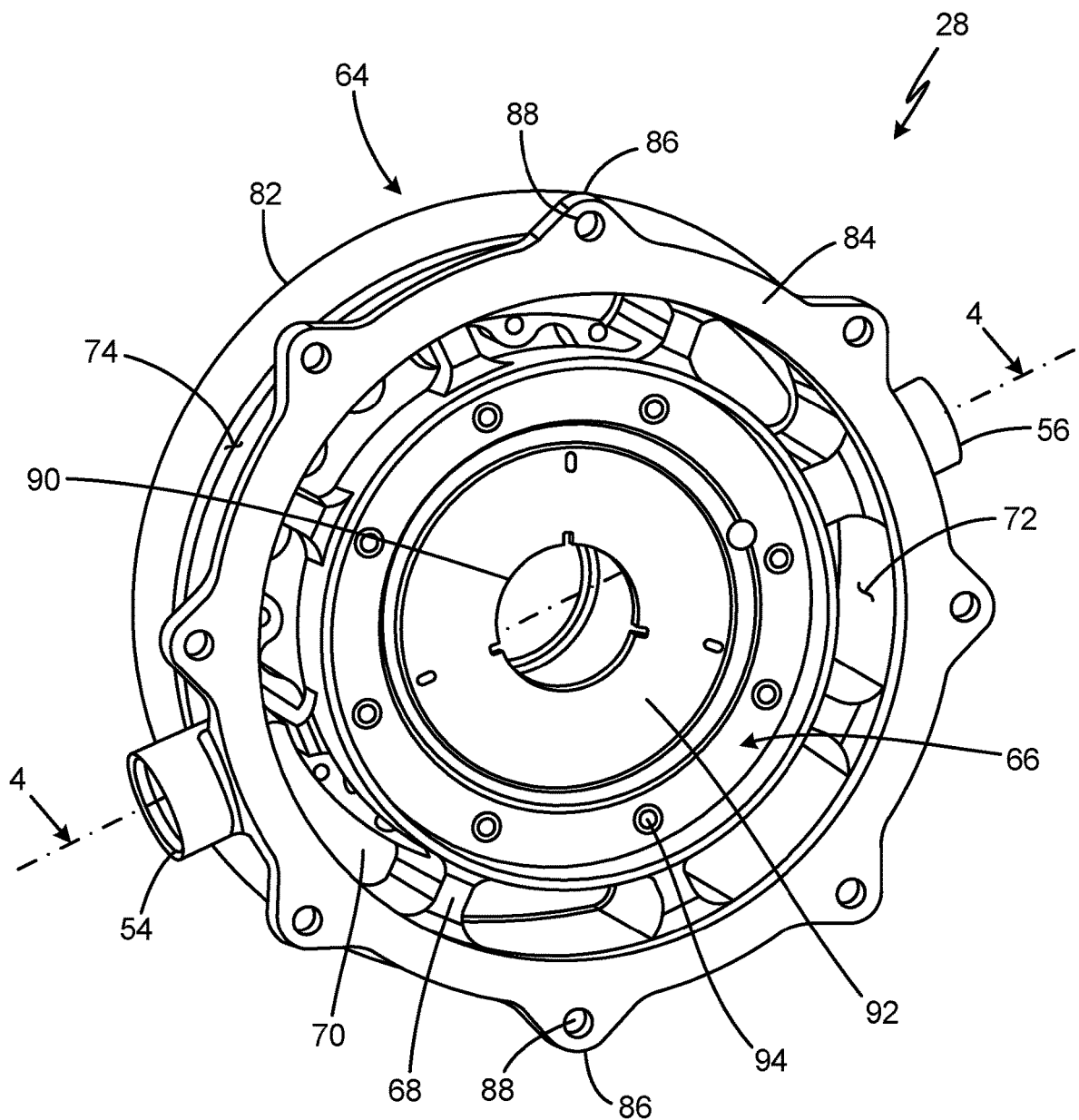
FIG. 2b is an isometric view of a compressor-facing side of the turbine housing including line 4-4.

FIG. 2a is an isometric view of turbine housing 28 showing turbine-facing side 60 and including line 3-3. FIG. 2b is an isometric view of turbine housing 24 showing compressor-facing side 62 and including line 4-4. FIGS. 2a and 2b will be described simultaneously. Turbine housing 24 includes bearing cooling inlet 54, bearing cooling outlet 56, turbine-facing side 60, compressor-facing side 62, outer housing portion 64, inner housing portion 66, struts 68 (shown in FIG. 2b), and cooling slots 70 (shown in FIG. 2b). Outer housing portion includes inner surface 72 and outer surface 74. Inner surface 72 has turbine-side flange 76 (shown in FIG. 2a), tabs 78 (shown in FIG. 2a), and bolt holes 80 (shown in FIG. 2*a*). Outer surface 74 has mounting flange 82, and compressor-side flange 78 including tabs 78 and bolt holes 80. Inner housing portion includes journal bearing bore 90, thrust bearing support surface 92 (shown in FIG. 2*b*) with pilot holes 94 (shown in FIG. 2*b*), and tabs 96 (shown in FIG. 2*a*) with bolt holes 98 (shown in FIG. 2*a*).

Turbine-facing side 60 is a first side of turbine housing 28. Compressor-facing side 62 is a second side of turbine housing 28 opposite turbine-facing side 60. Outer housing portion 64 is a radially outer portion of turbine housing 28. Inner housing portion 66 is a radially inner portion of turbine housing 28. Outer housing portion 64 is attached to inner housing portion 66 by struts 68. Cooling slots 70 are disposed between outer housing portion 64, inner housing portion 66, and struts 68.

Outer housing portion has inner surface 72, which is a radially inner surface and outer surface 74, which is a radially outer surface. Turbine-side flange 76 extends from inner surface 72 on turbine-facing side 60. Tabs 86 extend from turbine-side flange 76 and bolt holes 80 extending through the tabs 86. Mounting flange 80 extends from outer surface 74 between turbine-facing side 60 and compressor-facing side 62. Bearing cooling inlet 54 and bearing cooling outlet 56 extend from outer surface 74 between mounting flange 82 and compressor-facing side 62. Bearing cooling inlet 54 is opposite bearing cooling outlet 56. Compressor-side flange extends from outer surface 74 on compressor-facing side 62. Compressor-side flange includes tabs 86 with bolt holes 88 extending through tabs 86.

Inner housing portion 66 has journal bearing bore 90 extending from turbine-facing side 60 to compressor-facing side 62. Thrust bearing support surface 92 is a recessed surface of compressor-facing side 62. Pilot holes 94 are radially disposed around journal bearing bore 90 and thrust bearing support surface 92. Tabs 96 extend from an outer surface of inner housing portion 66 around journal bearing bore 90 on turbine-facing side 60. Bolt holes 98 run through tabs 96.

Turbine housing 28 is made of a metal, such as aluminum. Turbine-facing side 60 attaches to turbine nozzle 30 (not shown in FIGS. 2*a* and 2*b*), turbine shroud 32 (not shown in FIGS. 2*a* and 2*b*), and turbine seal plate 36 (not shown in FIGS. 2*a* and 2*b*) by fastening to turbine-side flange 76 with tabs 78 and bolt holes 80. Turbine housing 28 also attaches to turbine shroud 32 through tabs 86 with bolt holes 88. Turbine housing 28 attaches to compressor outlet housing 12 (not shown in FIGS. 2*a* and 2*b*) and bearing housing 26 (not shown in FIGS. 2*a* and 2*b*) on compressor-facing side 62 with fasteners through bolt holes 88 in tabs 86 of compressor-side flange 84 and through pilot holes 94, respectively, Mounting flange 82 holds two-wheel air cycle machine 2 to other portions of the air conditioning system, such as a heat exchanger (not shown in FIGS. 2*a* and 2*b*). Struts hold inner housing portion 66 steady within outer housing portion 64. Bearing cooling inlet 54 and bearing cooling outlet 56 create an inlet and an outlet, respectively, for the cooling flow within turbine housing 28 (see FIG. 1) and an outlet for the compressor rotor thrust balancing flow (See FIG. 1). Cooling slots 70 allow the bearing cooling flow to move through turbine housing 28 and exit at bearing cooling outlet 56. Journal bearing bore 90 supports turbine-side journal bearing 42 (not shown in FIGS. 2*a* and 2*b*) and tie rod 38 (not shown in FIGS. 2*a* and 2*b*). Thrust-bearing support surface 92 creates a cavity for and supports turbine-side thrust bearing 46 and thrust disk 48 (not shown in FIGS. 2*a* and 2*b*).

Turbine housing 28 attaches the stationary components of turbine assembly 6 to the stationary components of compressor assembly 4 in two-wheel air cycle machine 2. Turbine housing 28 supports turbine-side journal bearing 42 and turbine-side thrust bearing 46. Bearing cooling inlet 54 and bearing cooling outlet 56 along with cooling slots 70 between struts 68 create the bearing cooling flow path (see FIG. 1) to cool compressor-side journal bearing 44, turbine-side journal bearing 42, turbine-side thrust bearing 46 and compressor-side thrust bearing 50. Further, cooling slots 70 and bearing cooling outlet 56 create an outlet for the compressor rotor thrust balancing flow (see FIG. 1). Turbine housing 28 has the structural integrity to withstand high pressure and temperature during operation. Turbine housing 28 also has the structural integrity to contain pieces of air cycle machine 2 in case of rotor failure.

Figure 3:
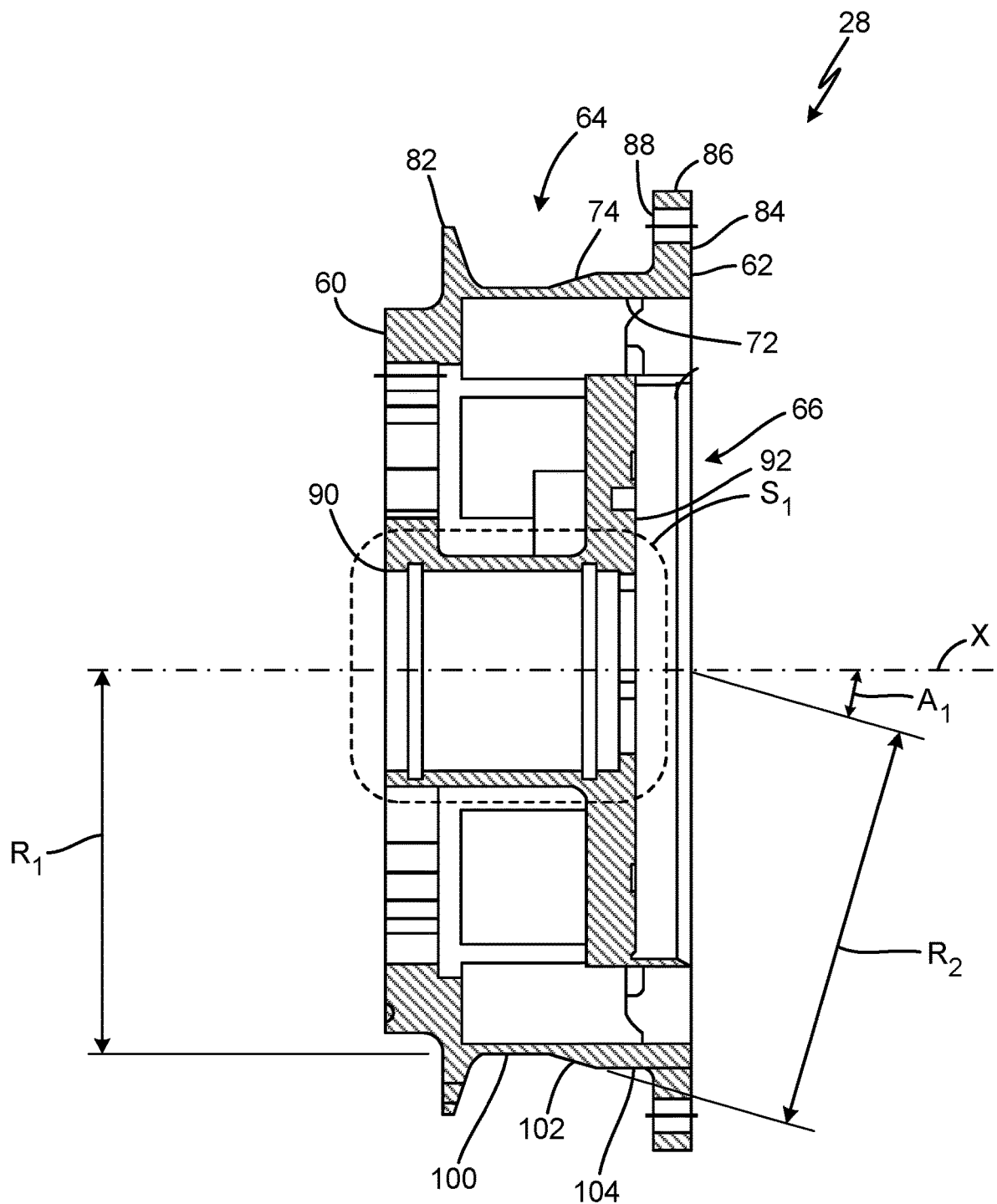
FIG. 3 is a cross section of the turbine housing taken along line 3-3 of FIG. 2a including shape $S_1$.
Figure 4:
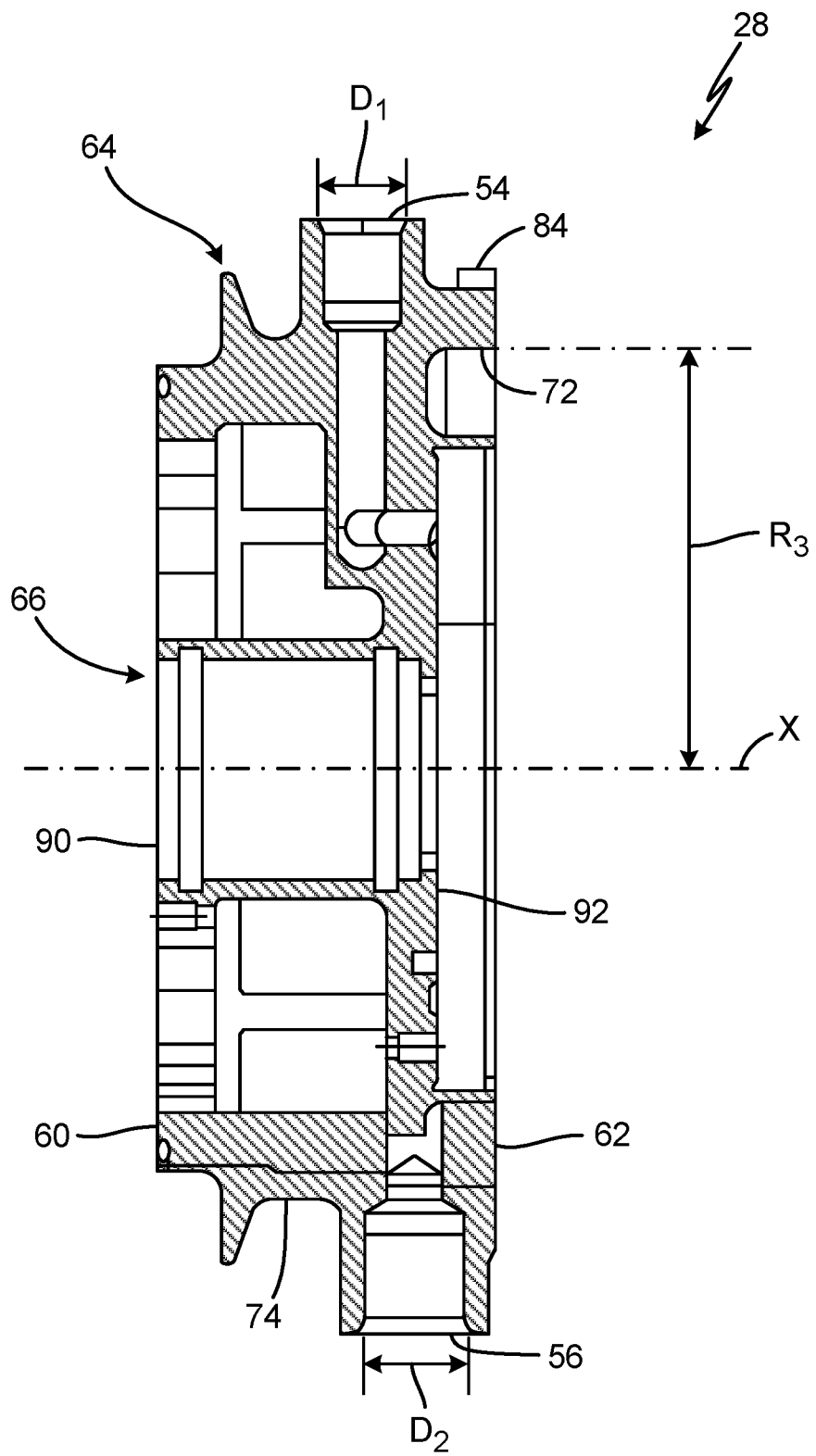
FIG. 4 is a cross section of the turbine housing taken along line 4-4 of FIG. 2b.

FIG. 3 is a cross section of turbine housing 28 taken along line 3-3 of FIG. 2*a* and includes shape $S_1$. FIG. 4 is a cross section of turbine housing 28 taken along line 4-4 of FIG. 2*b*. FIGS. 3 and 4 will be discussed together. Turbine housing 28 includes bearing cooling inlet 54 (shown in FIG. 4), bearing cooling outlet 56 (shown in FIG. 4), turbine-facing side 60, compressor-facing side 62, outer housing portion 64, and inner housing portion 66. Outer housing portion 66 includes inner surface 72 and outer surface 74. Outer surface 74 includes mounting flange 82 and compressor-side flange 84 with tabs 86 (shown in FIG. 3) and bolt holes 88 (shown in FIG. 3). Outer surface 74 also includes first parallel wall portion 100, frustoconical wall portion 102, and second parallel wall portion 104. Inner housing portion 66 includes journal bearing bore 90 and thrust bearing support surface 92. FIG. 3 also includes central axis x, radius $R_1$, radius $R_2$, angle $A_1$ and shape $S_1$. Also shown in FIG. 4 is central axis x, radius $R_3$, diameter $D_1$ and diameter $D_2$.

FIGS. 3 and 4 show turbine housing 28 centered around central axis x. Turbine-facing side 60 is a first side of turbine housing 28 and compressor-facing side is a second side 62 of turbine housing 28 axially away from turbine-facing side 60. Inner housing portion 62 is surrounded by outer housing portion 64. Inner surface 72 is a radially inner surface of outer housing portion 64. Outer surface 74 is a radially outer surface of outer housing portion 64. Mounting flange 82 and compressor-side flange 84 extend from outer surface 74 with mounting flange 82 positioned toward turbine-facing side 60 and compressor-mounting flange 82 flush with compressor-facing side 62. Compressor-side flange 84 has tabs 86 (shown in FIG. 3) with bolt holes 88 (shown in FIG. 3) therethrough. Journal bearing bore 90 runs between turbine-facing side 60 and compressor-facing side 62 of turbine housing 28. Journal bearing bore 90 is centered around axis x. Thrust bearing support surface 92 is a recessed surface of inner housing portion 64 on compressor-facing side 62. Shape $S_1$ (shown in FIG. 3) surrounds journal bearing bore 90.

As shown in FIG. 3, first parallel wall portion 100, frustoconical wall portion 102, and second parallel wall portion 104 are portions of outer surface 74 and are positioned between mounting flange 82 and compressor-side flange 84. A first side of first parallel wall portion 100 attaches to compressor mounting flange 82. A second side of first parallel wall portion 100 attaches to a first side of frustoconical wall portion 102. A second side of frustoconical wall portion 102 attaches to a first side of second parallel wall portion 104. A second side of second parallel wall portion 104 attaches to compressor-side mounting flange 82. First parallel wall portion 100 is a radius $R_1$ away from central axis x. Radius $R_1$ is between 3.115 inches (7.912 cm) and 3.155 inches (8.014 cm). Frustoconical wall portion 102 is a thickened wall portion compared to first parallel wall portion 100. Frustoconical wall portion 102 is conically positioned at angle $A_1$ offset from axis x. Angle $A_1$ is between 14.980 degrees and 15.020 degrees. Frustoconical wall portion 102 is a radius $R_2$ from offset angle $A_1$. Radius $R_2$ is between 3.328 inches (8.453 cm) and 3.332 inches (8.463 cm). A ratio of radius $R_1$ to radius $R_2$ is between 0.935 and 0.948.

As shown in FIG. 4, inner surface 72 is a radius $R_3$ from central axis x. Radius $R_3$ is between 3.030 inches (7.696 cm) and 3.070 inches (7.798 cm). A ratio of radius $R_1$ (shown in FIG. 3) to radius $R_3$ is between 1.015 and 1.041. FIG. 4 also shows bearing cooling inlet 54 and bearing cooling outlet 56 are positioned on outer surface 74 of outer housing portion 64 between mounting flange 82 and compressor-side flange 84. Bearing cooling inlet 54 is opposite bearing cooling outlet 56. Bearing cooling inlet 54 is fluidly attached to the air conditioning system in which two-wheel air cycle machine 2 is a part. Bearing cooling inlet 54 has a diameter $D_1$ that is between 0.339 in (0.861 cm) and 0.349 in (0.886 cm). Bearing cooling outlet has a diameter $D_2$ that is between 0.386 inches (0.980 cm) and 0.396 inches (1.006 cm). A ratio of diameter $D_1$ to diameter $D_2$ is between 0.856 and 0.904.

Turbine housing 28 supports tie rod 38 (not shown in FIGS. 3-4), turbine-side journal bearing 42 (not shown in FIGS. 3-4), and turbine-side thrust bearing 46 (not shown in FIGS. 3-4) within two-wheel air cycle machine 2. Journal bearing bore 90 holds turbine-side journal bearing 42 (not shown in FIGS. 3-4). Thrust bearing support surface 92 supports turbine-side thrust bearing 46 (not shown in FIGS. 3-4). Outer housing portion 64, including inner surface 72 and outer surface 74 with first parallel wall portion 100 and frustoconical wall portion 102 increase the structural integrity of turbine housing 28 to withstand internal pressure variations during operation of two-wheel air cycle machine 2. Bearing cooling inlet 54 and bearing cooling outlet 56 are an inlet and an outlet, respectively, to the bearing cooling flow path (see FIG. 1) that cools turbine-side journal bearing 42 (not shown in FIGS. 3-4), compressor-side journal bearing 44 (not shown in FIGS. 3-4), turbine-side thrust bearing 46 (not shown in FIGS. 3-4), and compressor-side thrust bearing 50 (not shown in FIGS. 3-4). Bearing cooling outlet is also an outlet for the compressor thrust balancing flow path (see FIG. 1).

Positioning first parallel wall portion 100 at radius $R_1$ from central axis x, frustoconical wall portion 102 at radius $R_2$ from offset angle $A_1$, and inner surface 72 at radius $R_3$ from central axis x create a geometry for outer housing portion 64. The geometry includes the ratio of radius $R_1$ to radius $R_2$ and the ratio of radius $R_1$ to radius $R_3$. The geometry increases the structural integrity of turbine housing 28 to withstand operating pressures and contain turbine-side journal bearing 42 and turbine-side thrust bearing 46 in case of rotor failure. Sizing bearing cooling outlet 56 to diameter $D_2$ controls the amount of the bearing cooling flow. Diameter $D_1$ and diameter $D_2$ are sized to allow enough flow to adequately cool turbine-side journal bearing 42, compressor-side journal bearing 44, turbine-side thrust bearing 46, and compressor-side thrust bearing 50 without too much parasitic loss from the rest of the air conditioning system.

Figure 5:
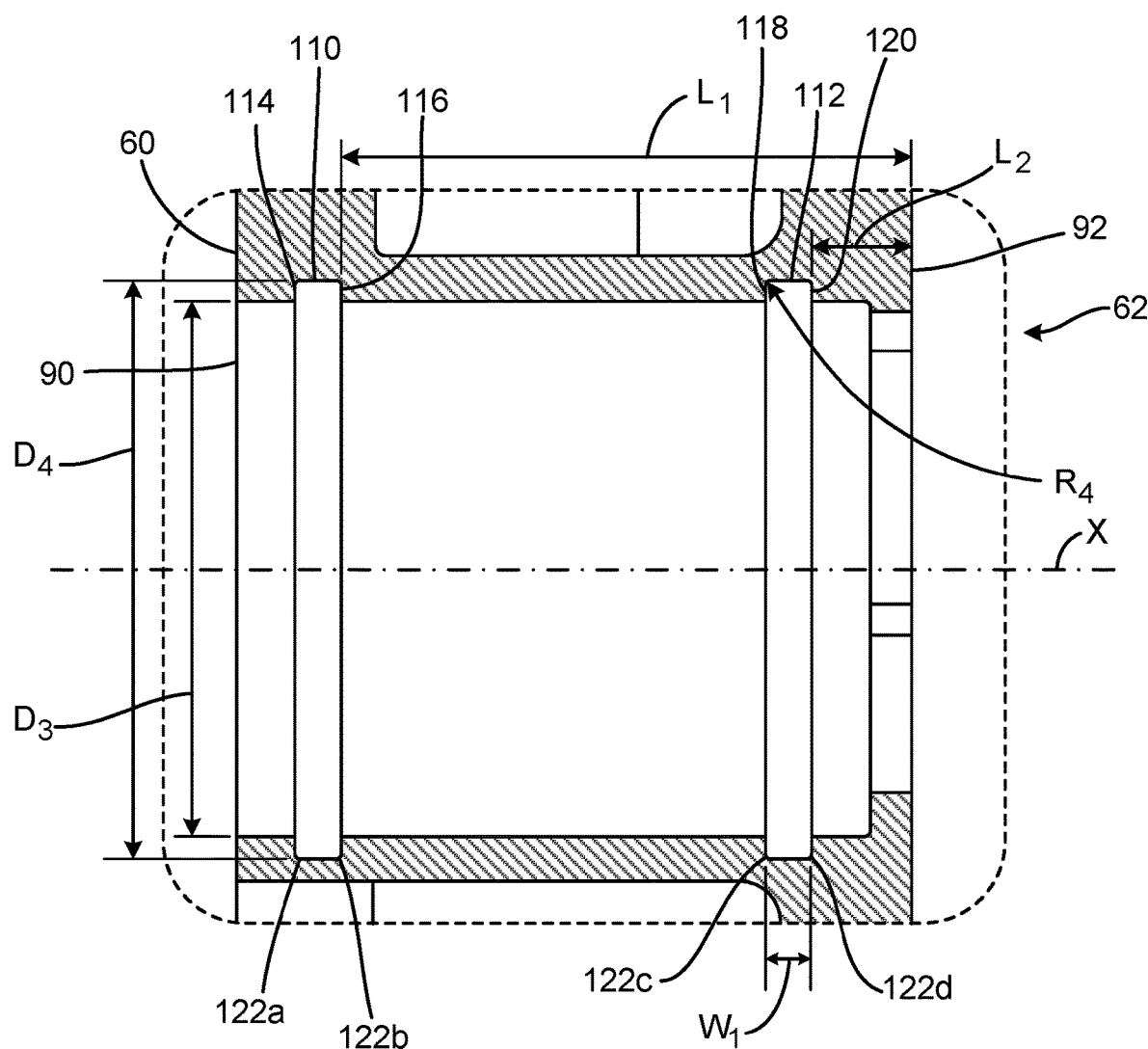
FIG. 5 is a closer view of a journal bearing bore in the turbine housing taken along shape $S_1$ in FIG. 3.

FIG. 5 is closer view of journal bearing bore 90 in turbine housing 28 taken along shape $S_1$ in FIG. 3. FIG. 5 includes turbine-facing side 60, compressor-facing side 62, journal bearing bore 90, and thrust bearing support surface 92. Journal bearing bore 90 further includes first O-seal gland 110 and second O-seal gland 112. First O-seal gland 110 has a first side 114 and a second side 116. Second O-seal gland 112 has a first side 118 and a second side 120. First O-seal gland 110 also includes a first edge 122a and second edge 122b. Second O-seal gland 112 includes third edge 122c and fourth edge 122d. FIG. 5 also shows central axis x, diameter $D_3$, diameter $D_4$, width $W_1$, radius $R_1$, length $L_1$, and length $L_2$.

Journal bearing bore 90 is centered around central axis x and has a first side flush with turbine-facing side 60 and a second side axially away from the first side and flush with thrust bearing support surface 92. Thrust bearing support surface 92 faces compressor-facing side 62. First O-seal gland 110 and second O-seal gland 112 are recessed into journal bearing bore 90. First O-seal gland 110 is positioned toward turbine-facing side 60. Second O-seal gland 112 is positioned toward compressor-facing side 62. First side 114 of first O-seal gland 110 faces turbine-facing side 60. Second side 116 of first O-seal gland 110 faces compressor-facing side 62. First side 118 of second O-seal gland 112 faces turbine-facing side 60. Second side 120 of second O-seal gland 112 faces compressor-facing side 62. First edge 122a is an edge of first O-seal gland 110 adjacent to first side 114. Second edge 122b is an edge of first O-seal gland 110 adjacent to second side 116. Third edge 122c is an edge of second O-seal gland 112 adjacent to first side 118. Fourth edge 122d is an edge of second O-seal gland 112 adjacent to second side 120.

Journal bearing bore 90 supports tie rod 38 (not shown in FIG. 5) and turbine-side journal bearing 42 (not shown in FIG. 5). Journal bearing bore has a diameter $D_3$ which is between 1.596 inches (4.054 cm) and 1.598 inches (4.059 cm). First O-seal gland 110 and second O-seal gland 112 hold rubber O-seals that stabilize turbine-side journal bearing 42. First O-seal gland 110 and second O-seal gland 112 have a diameter of $D_4$ which is between 1.728 inches (4.389 cm) and 1.732 inches (4.399 cm). A ratio of diameter $D_3$ to diameter $D_4$ is between 0.921 and 0.925. First O-seal gland is a width $W_1$ axially extending from first side 114 to second side 116. Similarly, second O-seal gland is the width $W_1$ axially extending from first side 118 to second side 120. Width $W_1$ is between 0.114 inches (0.290 cm) and 0.154 inches (0.391 cm). A ratio of width $W_1$ to diameter $D_4$ is between 0.066 and 0.089. Edge 122a, edge 122b, edge 122c, and edge 122d are filleted edges. Edge 122a, edge 122b, edge 122c, and edge 122d have a fillet radius of $R_4$. Radius $R_4$ is between 0.014 inches (0.036 cm) and 0.016 inches (0.041 cm). A ratio of width $W_1$ to $R_4$ is between 7.125 and 11.000. Second side 116 of first O-seal gland is positioned a length $L_1$ from thrust bearing support surface 92. Length $L_1$ is between 1.690 inches (4.293 cm) and 1.730 inches (4.394 cm). Second side 120 of second O-seal gland 112 is positioned a length $L_2$ from thrust bearing support surface 92. Length $L_2$ is between 0.285 inches (0.724 cm) and 0.325 inches (0.826 cm). A ratio of length $L_1$ to length $L_2$ is between 6.070 and 5.200.

Arranging journal bearing bore 90 with specific placement of first O-seal gland 110 and second O-seal gland 112 creates a surface to support turbine-side journal bearing 42 during operation of air cycle machine 2. Diameter $D_4$ is larger than diameter $D_3$ such that the ratio of diameter $D_3$ to diameter $D_4$ creates room for rubber O-seals to securely hold turbine-side journal bearing 42 while allowing room for thermal expansion during operation. Similarly, width $W_1$ and fillet radius $R_4$ are sized to create the ratio of width $W_1$ to diameter $D_4$ and the ratio of width $W_1$ to radius $R_4$ such that an O-seal can fit within first O-seal gland 110 and second O-seal gland 112 to securely hold turbine-side journal bearing 42. Length $L_1$ and length $L_2$ are placed along journal bearing bore 90 such that the ratio between length $L_1$ and length $L_2$ securely supports turbine-side journal bearing 42 while allowing room for thermal expansion within journal bearing bore 90 in compliance with regulations regarding journal bearing support in aircraft.

Discussion of Possible Embodiments

The following are non-exclusive descriptions of possible embodiments of the present invention.

A turbine housing for a two-wheel air cycle machine includes a first side, a second side, a central axis, an outer housing portion, an inner housing portion, a plurality of struts between the inner housing portion and the outer housing portion, and a plurality of cooling slots between the plurality of struts. The outer housing portion further includes an inner surface, an outer surface, a cooling inlet extending from the outer surface and a cooling outlet opposite the cooling inlet extending from the outer surface. The inner housing surface includes a thrust bearing surface substantially parallel to the second side of the turbine housing and a journal bearing bore extending between the first side of the turbine housing and the thrust bearing support surface.

The turbine housing of the preceding paragraph can optionally include, additionally and/or alternatively, any one or more of the following features, configurations and/or additional components:

Wherein the outer surface of the outer housing portion further includes a mounting flange, a first parallel wall surface substantially parallel to the central axis, a frustoconical wall surface, a second parallel wall surface substantially parallel to the central axis, and mounting tabs; the first parallel wall surface includes a first end and a second end with the first end connected to the mounting flange; the frustoconical wall surface includes a first end and a second end with the first end of the frustoconical wall surface attached to the second end of the first parallel wall surface; the second parallel wall surface including a first end and a second end with the first end of the second parallel wall surface connected to the second end of the frustoconical wall surface; and the mounting tabs extend from the outer surface of the outer housing portion at the second end of the second parallel wall surface.

Wherein the frustoconical wall portion is at an offset angle from the central axis and wherein the offset angle is between 14.980 degrees and 15.020 degrees.

Wherein the first parallel wall surface of the outer housing portion is positioned a first radius from the central axis, the frustoconical wall portion is positioned a second radius from the offset angle, and the inner surface of the outer surface of the outer housing portion is positioned a third radius from the central axis; wherein a ratio of the first radius to the second radius is between 0.935 and 0.948; and wherein a ratio of the first radius to the third radius is between 1.015 and 1.041.

Wherein the cooling inlet has a first diameter and the cooling outlet has a second diameter, and wherein a ratio of the first diameter to the second diameter is between 0.856 and 0.904.

Wherein the journal bearing bore has a third diameter and further includes a first O-seal gland and a second O-seal gland; the first O-seal gland includes a first side facing the first side of the turbine housing and a second side facing the thrust bearing support surface and the second O-seal gland including a first side facing the first side of the turbine housing and a second side facing the thrust bearing support surface.

Wherein the first O-seal gland and the second O-seal gland have a fourth diameter; wherein the ratio of the third diameter to the fourth diameter is between 0.921 and 0.925.

Wherein the first O-seal gland and the second O-seal gland have a width from the first side to the second side, respectively, and wherein a ratio of the width to the fourth diameter is between 0.066 and 0.089.

Wherein the first O-seal gland is positioned in the journal bearing bore so the second side of the first O-seal gland is a first length from the thrust bearing support surface and the second O-seal gland is positioned in the journal bearing bore so the second side of the second O-seal gland is a second length from the thrust bearing support surface, and wherein a ratio of the first length to the second length is between 5.200 and 6.070.

Wherein each edge of the first O-seal gland and the second O-seal gland have a fillet with a fillet radius of a fourth radius, and wherein a ratio of the width to the fourth radius is between 7.125 and 11.000.

A two-wheel air cycle machine includes a turbine assembly including a turbine rotor, a compressor assembly including a compressor rotor, a tie rod connecting the turbine rotor and the compressor rotor, and thrust bearings positioned between the compressor assembly and the turbine assembly. The turbine assembly includes a turbine rotor, a turbine housing, and a turbine-end journal bearing within the turbine housing. The turbine housing further includes a first side, a second side, a central axis, an outer housing portion, an inner housing portion, a plurality of struts between the inner housing portion and the outer housing portion, and a plurality of cooling slots between the plurality of struts. The outer housing portion further includes an inner surface, an outer surface, a cooling inlet extending from the outer surface and a cooling outlet opposite the cooling inlet extending from the outer surface. The inner housing surface includes a thrust bearing surface substantially parallel to the second side of the turbine housing and a journal bearing bore extending between the first side of the turbine housing and the thrust bearing support surface. The compressor assembly further includes a compressor inlet housing, a compressor outlet housing connected to the compressor inlet housing, a compressor seal housing within the compressor outlet housing, a bearing housing within the compressor outlet housing and attached at a first side to the compressor seal housing and attached at a second side to the turbine housing, and a compressor-end journal bearing within the bearing housing. The tie rod is supported by the turbine-end journal bearing and the compressor-end journal bearing. The thrust bearings are supported by the turbine housing and the bearing housing.

The air cycle machine of the preceding paragraph can optionally include, additionally and/or alternatively, any one or more of the following features, configurations and/or additional components:

Wherein the outer surface of the outer housing portion further includes a mounting flange, a first parallel wall surface substantially parallel to the central axis, a frustoconical wall surface, a second parallel wall surface substantially parallel to the central axis, and mounting tabs; the first parallel wall surface includes a first end and a second end with the first end connected to the mounting flange; the frustoconical wall surface includes a first end and a second end with the first end of the frustoconical wall surface attached to the second end of the first parallel wall surface;

the second parallel wall surface including a first end and a second end with the first end of the second parallel wall surface connected to the second end of the frustoconical wall surface; and the mounting tabs extend from the outer surface of the outer housing portion at the second end of the second parallel wall surface.

Wherein the frustoconical wall portion is at an offset angle from the central axis and wherein the offset angle is between 14.980 degrees and 15.020 degrees.

Wherein the first parallel wall surface of the outer housing portion is positioned a first radius from the central axis, the frustoconical wall portion is positioned a second radius from the offset angle, and the inner surface of the outer surface of the outer housing portion is positioned a third radius from the central axis; wherein a ratio of the first radius to the second radius is between 0.935 and 0.948; and wherein a ratio of the first radius to the third radius is between 1.015 and 1.041.

Wherein the cooling inlet has a first diameter and the cooling outlet has a second diameter, and wherein a ratio of the first diameter to the second diameter is between 0.856 and 0.904.

Wherein the journal bearing bore has a third diameter and further includes a first O-seal gland and a second O-seal gland; the first O-seal gland includes a first side facing the first side of the turbine housing and a second side facing the thrust bearing support surface and the second O-seal gland including a first side facing the first side of the turbine housing and a second side facing the thrust bearing support surface.

Wherein the first O-seal gland and the second O-seal gland have a fourth diameter; wherein the ratio of the third diameter to the fourth diameter is between 0.921 and 0.925.

Wherein the first O-seal gland and the second O-seal gland have a width from the first side to the second side, respectively, and wherein a ratio of the width to the fourth diameter is between 0.066 and 0.089.

Wherein the first O-seal gland is positioned in the journal bearing bore so the second side of the first O-seal gland is a first length from the thrust bearing support surface and the second O-seal gland is positioned in the journal bearing bore so the second side of the second O-seal gland is a second length from the thrust bearing support surface, and wherein a ratio of the first length to the second length is between 5.200 and 6.070.

Wherein each edge of the first O-seal gland and the second O-seal gland have a fillet with a fillet radius of a fourth radius, and wherein a ratio of the width to the fourth radius is between 7.125 and 11.000.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine housing for a two-wheel air cycle machine, the turbine housing comprising:
 a first side of the turbine housing;
 a second side of the turbine housing;
 a central axis;
 an outer housing portion comprising:
  an inner surface of the outer housing portion;
  an outer surface of the outer housing portion comprising:
   a mounting flange;
   a first parallel wall surface substantially parallel to the central axis with a first end and a second, the first end of the first parallel wall surface being connected to the mounting flange;
   a frustoconical wall surface with a first end and a second end, the first end of the frustoconical wall surface being connected to the second end of the first parallel wall surface;
   a second parallel wall surface substantially parallel to the central axis with a first end and a second end, the first end of the second parallel wall surface being connected to the second end of the frustoconical wall surface; and
   mounting tabs extending from the outer surface of the outer housing portion at the second end of the second parallel wall surface;
  a cooling inlet extending from the outer surface of the outer housing portion; and
  a cooling outlet opposite the cooling inlet and extending from the outer surface of the outer housing portion;
 an inner housing portion comprising:
  a thrust bearing support surface substantially parallel to the second side of the turbine housing; and
  a journal bearing bore extending between the first side of the turbine housing and the thrust bearing support surface;
 a plurality of struts between the inner housing portion and the outer housing portion; and
 a plurality of cooling slots between the plurality of struts.

2. The turbine housing of claim 1, wherein the frustoconical wall portion is at an offset angle from the central axis, and wherein the offset angle is between 14.980 degrees and 15.020 degrees.

3. The turbine housing of claim 2, wherein the first parallel wall surface of the outer housing portion is positioned a first radius from the central axis, the frustoconical wall portion is positioned a second radius from the offset angle, and the inner surface of the outer surface of the outer housing portion is positioned a third radius from the central axis, and wherein a ratio of the first radius to the second radius is between 0.935 and 0.948, and wherein a ratio of the first radius to the third radius is between 1.015 and 1.041.

4. The turbine housing of claim 1, wherein the cooling inlet has a first diameter and the cooling outlet has a second diameter, and wherein a ratio of the first diameter to the second diameter is between 0.856 and 0.904.

5. The turbine housing of claim 1, wherein the journal bearing bore has a third diameter and further comprises:
 a first O-seal gland with a first side facing the first side of the turbine housing and a second side facing the thrust bearing support surface; and
 a second O-seal gland with a first side facing the first side of the turbine housing and a second side facing the thrust bearing support surface.

6. The turbine housing of claim 5, wherein the first O-seal gland and the second O-seal gland have a fourth diameter, and wherein the ratio of the third diameter to the fourth diameter is between 0.921 and 0.925.

7. The turbine housing of claim 5, wherein first O-seal gland and the second O-seal gland have a width from the first side to the second side, respectively, and wherein a ratio of the width to the fourth diameter is between 0.066 and 0.089.

8. The turbine housing of claim 7, wherein the first O-seal gland is positioned in the journal bearing bore so the second side of the first O-seal gland is a first length from the thrust bearing support surface and the second O-seal gland is positioned in the journal bearing bore so the second side of the second O-seal gland is a second length from the thrust bearing support surface, and wherein a ratio of the first length to the second length is between 5.200 and 6.070.

9. The turbine housing of claim 7, wherein each edge of the first O-seal gland and the second O-seal gland have a fillet with a fillet radius of a fourth radius, and wherein a ratio of the width to the fourth radius is between 7.125 and 11.000.

10. A two-wheel air cycle machine for an aircraft, the two-wheel air cycle machine comprising:
a turbine assembly comprising:
a turbine rotor;
a turbine housing comprising:
a first side of the turbine housing;
a second side of the turbine housing;
a central axis;
an outer housing portion comprising:
an inner surface of the outer housing portion;
an outer surface of the outer housing portion;
a cooling inlet extending from the outer surface of the outer housing portion; and
a cooling outlet opposite the cooling inlet and extending from the outer surface of the outer housing portion;
an inner housing portion comprising:
a thrust bearing support surface substantially parallel to the second side of the turbine housing; and
a journal bearing bore extending between the first side of the turbine housing and the thrust bearing support surface;
a plurality of struts between the inner housing portion and the outer housing portion; and
a plurality of cooling slots between the plurality of struts; and
a turbine-end journal bearing within the turbine housing;
a compressor assembly comprising:
a compressor inlet housing;
a compressor outlet housing connected to the compressor inlet housing;
a compressor seal housing within the compressor outlet housing;
a bearing housing within the compressor outlet housing and attached at a first side to the compressor seal housing and attached at a second side to the turbine housing; and
a compressor-end journal bearing within the bearing housing;
a tie rod connecting the turbine rotor and the compressor rotor and supported by the turbine-end journal bearing and the compressor-end journal bearing; and
thrust bearings centrally positioned between the turbine assembly and the compressor assembly supported by the turbine housing and the bearing housing.

11. The two-wheel air cycle machine of claim 10, wherein the outer surface of the outer housing portion of the turbine housing further comprises:
a mounting flange;
a first parallel wall surface substantially parallel to the central axis with a first end and a second, the first end of the first parallel wall surface being connected to the mounting flange;
a frustoconical wall surface with a first end and a second end, the first end of the frustoconical wall surface being connected to the second end of the first parallel wall surface;
a second parallel wall surface substantially parallel to the central axis with a first end and a second end, the first end of the second parallel wall surface being connected to the second end of the frustoconical wall surface; and
mounting tabs extending from the outer surface of the outer housing portion at the second end of the second parallel wall surface.

12. The turbine housing of claim 11, wherein the frustoconical wall portion is at an offset angle from the central axis, and wherein the offset angle is between 14.980 degrees and 15.020 degrees.

13. The turbine housing of claim 12, wherein the first parallel wall surface of the outer housing portion is positioned a first radius from the central axis, the frustoconical wall portion is positioned a second radius from the offset angle, and the inner surface of the outer surface of the outer housing portion is positioned a third radius from the central axis, and wherein a ratio of the first radius to the second radius is between 0.935 and 0.948, and wherein a ratio of the first radius to the third radius is between 1.015 and 1.041.

14. The two-wheel air cycle machine of claim 10, wherein the cooling inlet has a diameter $D_1$ and the cooling outlet has a second diameter, and wherein a ratio of the first diameter to the second diameter is between 0.856 and 0.904.

15. The two-wheel air cycle machine of claim 10, wherein the journal bearing bore of the turbine housing further comprises:
a first O-seal gland with a first side facing the turbine first side of the turbine housing and a second side facing the thrust bearing support surface; and
a second O-seal gland with a first side facing the first side of the turbine housing and a second side facing the thrust bearing support surface.

16. The two-wheel air cycle machine of claim 15, wherein the journal bearing bore has a third diameter and the first O-seal gland and the second O-seal gland have a fourth diameter, and wherein the ratio of the third diameter to the fourth diameter is between 0.921 and 0.925.

17. The two-wheel air cycle machine of claim 16, wherein the first O-seal gland and the second O-seal gland have a width from the first side to the second side, respectively, and wherein a ratio of the width to the fourth diameter is between 0.066 and 0.089.

18. The two-wheel air cycle machine of claim 17, wherein each edge of the first O-seal gland and the second O-seal gland have a fillet with a fillet radius of a fourth radius, and wherein a ratio of the width to the fourth radius is between 7.125 and 11.000.

19. The two-wheel air cycle machine of claim 16, wherein the first O-seal gland is positioned in the journal bearing bore so the second side of the first O-seal gland is a first length from the thrust bearing support surface and the second O-seal gland is positioned in the journal bearing bore so the second side of the second O-seal gland is a second length from the thrust bearing support surface, and wherein a ratio of the first length to the second length is between 5.200 and 6.070.

* * * * *